United States Patent
Wojtulewicz

[11] 3,732,424
[45] May 8, 1973

[54] STAR TRACKING DEVICE

[75] Inventor: Waclaw Wojtulewicz, Paterson, N.J.

[73] Assignee: The Singer Company, New York, N.Y.

[22] Filed: Apr. 21, 1971

[21] Appl. No.: 136,009

[52] U.S. Cl..................250/203 R, 350/6, 350/285, 250/235
[51] Int. Cl..................................................G01j 1/20
[58] Field of Search......................250/203, 236, 235; 356/147; 350/289, 6, 285; 310/36

[56] References Cited

UNITED STATES PATENTS

| | | | |
|---|---|---|---|
| 3,330,958 | 7/1967 | Kaisler et al. | 250/203 R |
| 3,388,629 | 6/1968 | Brenholdt et al. | 356/147 |
| 3,612,701 | 10/1971 | Bleicher | 250/203 R |
| 3,642,344 | 2/1972 | Corker | 250/235 X |

*Primary Examiner*—Walter Stolwein
*Attorney*—S. A. Giarratana and Thomas W. Kennedy

[57] ABSTRACT

A star tracking device in which a source of light is moved across a detector by being reflected from the front reflecting surface of an oscillating reflector placed in the path of the light. The detector generates an output signal which corresponds to the place of incidence thereon of the reflected light. A signal corresponding to the angular position of the reflector is produced utilizing light reflected from the rear side thereof. Electronic circuitry utilizes the detector output signal and the angular position signal to supply a signal which corresponds to the position of the source of light relative to the device. A torque motor, utilizing a bifurcated torsion-bar-mounted armature, is provided for oscillating the reflector and includes redundant electromagnets for supplying motive force.

5 Claims, 7 Drawing Figures

PATENTED MAY 8 1973

INVENTOR
WACLAW WOJTULEWICZ

BY S. A. Giavricetona
Thomas W. Kennedy
ATTORNEYS

PATENTED MAY 8 1973 3,732,424

INVENTOR
WACLAW WOJTULEWICZ

BY
Thomas W. Kennedy
ATTORNEYS

INVENTOR
WACLAW WOJTULEWICZ

STAR TRACKING DEVICE

BACKGROUND OF THE INVENTION

1. Field of Invention

This invention relates to a relative position device and more particularly to such a device having an electromagnetically powered light chopper in combination with an angular position encoder.

2. Description of the Prior Art

Systems have been designed to determine the position of a light source, such as a star, with respect to a desired position in the image plane of a telescope as part of navigational systems. A scanner is often employed to determine the position of the star image, and this, coupled with information as to the position of the scanner, has been used to determine the necessary navigational information. In many instances, the scanner is in the form of an oscillating angular reflector with a shaft encoder used to obtain the position of the oscillating reflector. Autocollimators or laser interferometers have been incorporated to measure the angular deflection of the reflector, and tuning forks, piezoelectric devices or magnetostrictive devices have often been utilized to oscillate the reflector. The size and relatively inefficiency of these devices coupled with the large driving forces required have rendered them unsuitable for precision, low-cost use. Further, the systems of the prior art were subject to excessive wear, backlash, and noise.

SUMMARY OF THE INVENTION

It is therefore an object of the present invention to provide a star tracking device in which a reflected beam of light is moved across a detector by use of an electromagnetically powered torsional light scanner which is compact, simple in operation, and has relatively few moving parts.

Another object of the present invention is to provide a device of the above type which is capable of indicating the position of a reflector with great accuracy within a confined space.

Toward the fulfillment of these objects the device of the present invention includes a reflector with front and rear reflecting surfaces, one of the reflecting surfaces arranged in the path of the source of light to be detected, an additional source of light directed toward the other reflecting surface, a torque motor to oscillate the reflector causing corresponding oscillation of the reflected light, first and second sensors facing the respective reflecting surfaces which generate output signals corresponding to the position of the moving reflected light and the reflector position respectively, and electronics for comparing and processing the output signals to determine the position of the source of light.

BRIEF DESCRIPTION OF THE DRAWINGS

Further objects and advantages of the present invention will become apparent and the exact nature of the invention will be clearly understood when the following description is considered in conjunction with the drawings in which:

FIG. 2 is a schematic representation of the angular position indicator of the present invention;

FIG. 3 is a schematic view of the photodetectors used in the angular position indicator of FIG. 2 shown with a light pattern imposed thereon;

DESCRIPTION OF THE PREFERRED EMBODIMENTS

Figure 1:
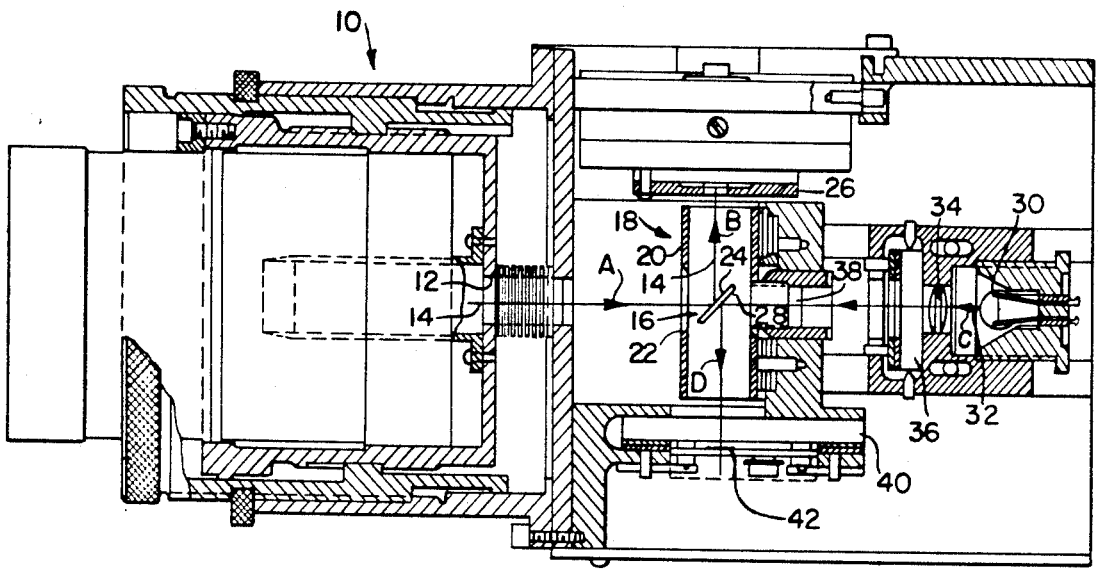
FIG. 1 is a vertical sectional view of a navigational telescope incorporating the star tracking device of the present invention.

FIG. 1 shows the star tracking device of the present invention mounted in a Cassegrainian telescope 10. It is understood that the telescope 10 may be of a conventional type, and includes a lens and mirror system (not shown) so arranged that collimated light from a light source such as a star, enters the central portion of the telescope through an opening 12 therein. A central ray of the collimated light is shown by the reference numeral 14 for convenience of presentation, moves in a direction shown by the arrow A in FIG. 1, and impinges upon a mirror 16 mounted in a torque motor unit 18. The unit 18 includes a cover plate 20 having an opening 22 centrally thereof, through which the light 14 passes, and is adapted to continually oscillate the mirror 16 in a manner to be described in detail below.

The mirror 16 has a front reflecting surface 24 which directs the light 14 in the direction indicated by arrow B toward a detector 26 mounted adjacent the torque motor unit 18. By virtue of the above oscillation, the light 14 is swept across the detector 26.

The detector 26 may be of the type which utilizes a moving image of the light source to determine the angular position of the light source relative to the detector such as, for example, the detector disclosed in U.S. Pat. No. 3,388,629, assigned to the same assignee as the present application. In general, the light detector disclosed in this patent uses two slits disposed on a face thereof at a predetermined known angle to each other, forming a mask over a sensing means. When the image is oscillated across the face of the detector, it strikes each of the slits and produces a signal. The position of the light source in the "X" and "Y" planes is determined by appropriate electronics using the crossing time between the two slits which are of a known orientation and geometrical relationship.

According to the present invention, a device is provided for monitoring the precise instantaneous angular position of the mirror 16. In particular, the rear surface 28 of the mirror 16 is made reflective, and an internal light source 30 directs light, a central ray of which is shown by the reference numeral 32, toward this rear surface in the direction indicated by the arrow C. In this movement the light 32 passes through a collimating lens system 34, a primary coded ruler 36, and an objective lens assembly 38. Upon striking the surface 28, the light is reflected toward a secondary coded ruler 40 in the direction indicated by the arrow D through which it passes before impinging upon a detector unit 42.

FIG. 2 better depicts the specific details of the above angular position device. In particular, the primary coded ruler 36 includes a uniform series of count rulings 44 thereon which is identical in both arrangement and size to a series of count rulings 46 on the secondary coded ruler 40. The detector unit 42 includes a plurality of light detectors 48, 50, 52 and 54 which are compatible in size and shape with the count rulings 44 and 46. The count rulings 44 consist of a plurality of alternating equal width opaque and transparent lines which form the light 32 into a pattern which is focused by the objective lens assembly 38 upon the rear reflecting surface 28 of the mirror 16. The pattern reflects from the surface 28 and impinges upon the count rulings 46 of the secondary coded ruler 40. The pattern of light reaching the secondary coded ruler 40 is somewhat larger than the pattern of count rulings 46 on the secondary coded ruler 40 due to the divergence of the light as it moves through the device. This results in a general lack of coincidence between the light which reaches the rulings 46 and the transparent portions of the rulings. Consequently, only a portion of the light pattern reaching the count rulings 46 will be passed therethrough to impinge upon the detectors 48, 50, 52 and 54 and cause them to produce output signals.

Referring to FIG. 3, the reference numeral 56 refers in general to a pattern of light presented to the detectors 48, 50, 52 and 54 resulting from the successive passage of light through each of the coded rulers 44 and 46 for a central or null position of the mirror. The dashed lines enclose areas where the light from the source 30 is blocked out by the opaque portions of the count rulings 44 and 46, and the areas between the dashed-line-enclosed areas represent the light that is actually presented to the detectors 48, 50, 52 and 54 at this particular position of the mirror 16. The geometric arrangement of the system is such that a minimum amount of light is presented to the detector 48 while a maximum amount of light is presented to the detector 52 with the mirror 16 in its central or null position. The detectors 50 and 54 are disposed with respect to the pattern 56 so as to operate in a similar manner to the detectors 48 and 52.

Of course, the aforementioned oscillation of the mirror 16 results in a movement of the pattern 56 across the face of the detectors 48, 50, 52 and 54 and causes the voltage of the output signal produced by the detectors to vary in synchronism with this pattern movement.

If the detectors 48 and 52 are connected so as to produce a single output the resulting combined output will vary sinusoidally from a positive maximum through zero to a negative maximum back to zero. In a similar manner detectors 50 and 54 are connected together and supply a similar output. The output signal from detectors 48 and 52 is available at terminal 58 connected thereto and, in a similar manner, the output from detectors 50 and 54 is available at terminal 60.

Returning now to FIG. 2, in order to determine the direction of movement of the mirror 16 a plurality of alternating equal width opaque and transparent rulings 62 and 64 are formed on the coded rulers 36 and 40 respectively and are adapted to create an additional light pattern shown generally by reference numeral 57 in FIG. 3 in a manner similar to that described above. In particular, the light passes from the source 30 through the collimating lens system 34, through the transparent portions of rulings 62, reflects from the surface 28 of the mirror 16 and passing through the transparent portions of the rulings 64. As in the previous arrangement, the light pattern which reaches the rulings 64 on the secondary coded ruler 40 is slightly enlarged relative to the ruling 62 due to the divergence of the system.

The rulings 64, while similar in geometric arrangement to the null rulings 62, are slightly enlarged with respect to the latter rulings so as to be equal in size to this magnified pattern incident upon the rulings 64. The detector unit 42 includes a detector 66 which is in registry with rulings 64 and with the light pattern 57 presented to the detector 66. Therefore, the intensity of the light produced by the pattern 57 incident upon the detector 66 will be at a maximum when the mirror 16 is in its central or null position due to the correspondence between the pattern caused by the rulings 62 and the pattern caused by the rulings 64. The output signal from the detector 66 is available at terminals 68 and 70 connected thereto.

Figure 4:
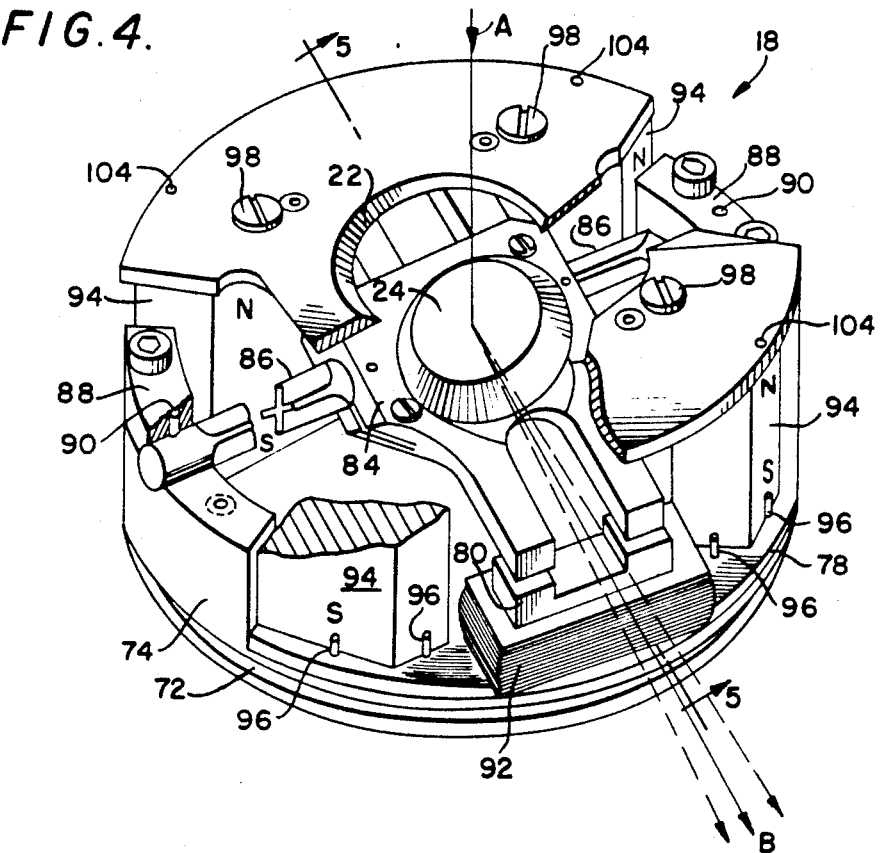
FIG. 4 is a perspective view, partially broken away, of the torsion motor of the present invention.
Figure 5:
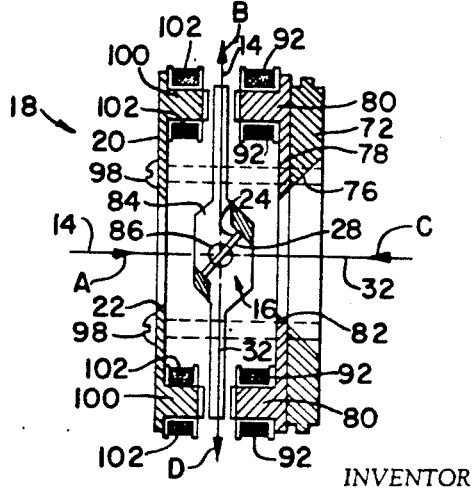
FIG. 5 is a cross-sectional view taken along the line 5—5 of FIG. 4.

The torque motor unit 18 of FIG. 1 is best illustrated in FIGS. 4 and 5 and includes an aluminum base 72 of substantially cylindrical configuration the main portion of which is relatively thin and includes two generally arcuate projections 74 which project upwardly therefrom. A frustoconical hole 76 is formed in the base 72 and is concentric therewith, with the axis of the hole extending perpendicularly to the plane of the base. A relatively thin flat plate 78 of material of high magnetic permeability, such as iron, abuts the upper portion of the base 72 and is provided with cutouts to enable it to fit around the arcuate projections 74 and rest in intimate contact with the base. This plate 78, which serves as a magnetic return path, includes two U-shaped pole pieces 80 located diametrically opposite each other on the plate midway between the arcuate projections 74. The plate 78 includes an opening 82 which is aligned with the hole 76 in the base 72.

The mirror 16 is mounted in the central portion of a bifurcated, generally H-shaped, armature 84 at an angle of 45° to the plane thereof. Two torsion bars 86 are attached to the periphery of the central portion of the armature 84 and extend at right angles thereto. The distal portions of the bars 86 are clamped to the arcuate projections 74 by clamps 88. The bars 86 are prevented from rotating within this enclosure by pins 90 which extend through the clamps 88, pass progressively through the distal ends of the bars 86 and terminate within the arcuate projections 74. A control coil 92 is formed on each pole piece 80 by a plurality of turns of wire. Four substantially rectangular permanent magnets 94 are mounted on the plate 78, are held in position thereon by pins 96, and extend between the control coils 92 and the arcuate projections 74. The cover plate 20, previously mentioned in connection with FIG. 1, is also made of a material of high magnetic permability, such as iron, is identical in shape to the plate 78 and is secured to the base 72 by screws 98 and spaced therefrom by the permanent magnets 94.

As shown in FIG. 5, two U-shaped pole pieces 100 project from the cover plate 20 towards the pole pieces 80 projecting from the plate 78. The pole pieces 100 are identical to the pole pieces 80 and are located diametrically opposite one another so as to be aligned with the pole pieces 80. Control coils 102 are formed on pole pieces 100 by a plurality of turns of wire. Additional pins 104 protrude from plate 20 to aid in securing magnets 94 in position within the torque motor unit 18.

Figure 6:
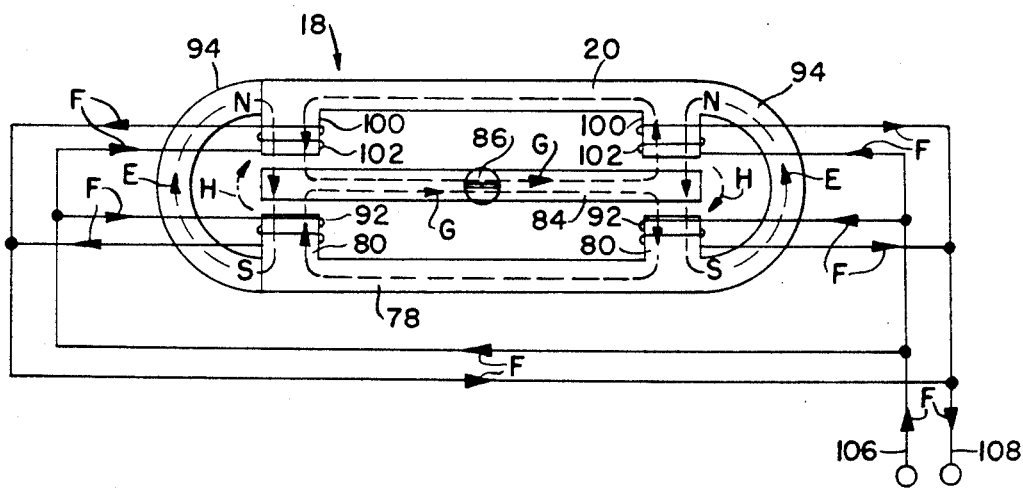
FIG. 6 is a schematic view of the torque motor of FIG. 4 showing the magnetic flux paths.

FIG. 6 is a schematic view of the torque motor unit 18, depicting the electrical connections to the control coils 92 and 102 as well as the magnetic flux paths. In particular, a pair of conductors 106 and 108 extend from the coils 92 and 102 and are adapted to be connected to a source of alternating current (not shown). In operation, when there is no current flowing through the conductors 106 and 108, the armature 84 remains with its bifurcated distal portions equally spaced between the pole pieces 80 and 100 due to the influence of the equal-acting magnetic field set up by the permanent magnets 94 in the direction indicated by the arrow E in FIG. 6, and the centering effect of the torsion bars 86. When current flows through the conductors 106 and 108 in the direction indicated by arrows F, a magnetic field is induced in the coils 92 and 102, in a conventional manner, which magnetizes the pole pieces 80 and 100 and induces a magnetic field in the plates 20 and 78. This induced field travels a path which includes the armature 84 in a direction indicated by the arrows G. Due to the resultant torque acting upon the armature 84 in the direction indicated by the arrows H the torque exerted on the armature 84 by the torsion bars 86 and the permanent magnets 94 is overcome and the armature 84 moves in a clockwise manner as shown by arrow H in FIG. 6.

A reversal of the direction of the current through the conductors 106 and 108 results in a reversal of the magnetic field caused by the control coils 92 and 102, and therefore a reversal of the magnetic field induced in the plates 20 and 78, as well as in the armature 84. Consequently, the direction of the torque acting on the armature 84 and the resultant movement of the armature will be reversed. The armature 84 will therefore oscillate with a frequency equal to the frequency of the applied alternating current.

It can be appreciated that the armature 84 would oscillate in the foregoing manner if only one of the four control coils 92 or 102 were made electromagnetically operable since the field created by this single coil would serve to upset the torsional balance of the armature 84. The redundancy of the coils 84 adds a measure of control and reliability to the device.

Figure 7:
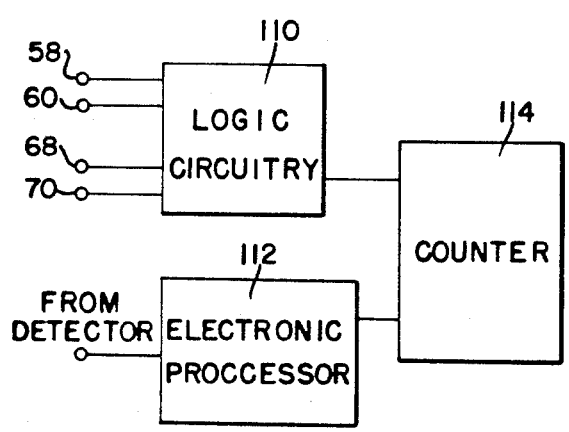
FIG. 7 is a schematic representation of the electronics used in the angular position indicator of the present invention.

FIG. 7 illustrates the electronics for producing a signal indicative of the relative position of the light source which includes logic circuitry 110, an electronic processor 112 and a counter 114. The output signal from the light detectors 48, 50, 52 and 54 as applied to the terminals 58 and 60 which corresponds to the angular deflection of the mirror 16, is supplied to the logic circuitry 110 as well as the null position signal from the detector 66 as applied to the terminals 68 and 70.

The output signal form the terminals 58 and 60 is shaped by the logic circuitry 110 so that pulses are generated in response to the signals from the detectors 48, 50, 52 and 54, which pulses are supplied to the counter 114. The logic circuitry 110 also uses the signal supplied from terminals 68 and 70 to produce a signal indicative of the position of the mirror 16, which is also supplied to the counter 114.

The output from the detector 26 is in the form of an electronic signal corresponding to the position of the light source in the "X" and "Y" planes and is processed by the electronic processor 112 which amplifies the signal from the detector 26 and which may include a Schmitt trigger circuit, or the like, to generate an output pulse when the amplified signal exceeds a predetermined level. The output from the electronic processor 112 is also supplied to the counter 114 which operates upon this and the signal supplied from the logic circuitry 110 to generate output counts which are directly proportional to the position of the light source with respect to the optical axis of telescope 10.

In the event that the star tracker of the present invention is utilized in a space vehicle, this output signal can, in turn, be applied to a computer, or the like, for computing the exact relative position of the vehicle with reference to the star and provide any necessary navigational corrections.

The advantages of the device of the present invention are many. For example, the optical path indicated for the preferred embodiment of the angular position device is an L-shape thereby admitting of easy and simple alignment of the optical components. The containment upon a single ruler of the angular deflection and null position patterns allows the sharing of a single optical system by both channels. This eliminates the use of a prism or pentaprism with the attendant loss of light energy associated therewith. Additionally, the relatively few optical elements included lead to stability and economy of manufacture. Further, the number of lines per inch can be made relatively large by the use of photolithograpy resulting in a wide sensing area which minimizes ruling errors. Also, the system is virtually insensitive to vibration and is free of shaft misalignment error due to the absence of the usual shaft and bearings.

Further, the H-shape of the armature 84 reduces its interia while maintaining an effective magnetic linkage between the armature 84 and the pole pieces 80 and 100 when they are electromagnetically energized. Also, the H-shape permits the unimpeded passage of the light 14 and 32 through the torque motor unit 18.

While one specific embodiment of the present invention has been illustrated and has been described in detail herein, it would be readily appreciated to those skilled in the art that numerous modifications and changes may be made without departing from the spirit and scope of the present invention.

I claim:

1. A system for detecting the position of a source of light comprising a motor having first and second and third axes disposed in quadrature and having an armature having front and rear reflecting surfaces, one of said reflecting surfaces disposed in the path of said source of light, an additional source of light having a ray of light directed along said first axis towards the other of said reflecting surfaces, said motor having a stator arranged to oscillate said armature about said third axis to cause corresponding oscillatory movement of the reflected light from said surfaces, a first and second sensing means arranged coaxially along said second axis and facing said front and rear surfaces, respectively, and directly exposed to the reflected light from said front and rear surfaces, respectively, said first sensing means being responsive to the position of said moving reflected light for generating a corresponding output signal, and second sensing means responsive to the position of said reflecting means for generating a corresponding output signal, and electronic means for comparing and processing said output signals and determining the position of said source of light, wherein said stator has first and second torsion bars axially spaced along said third axis, each said torsion bar being fixedly connected at one end thereof to said armature and being fixedly connected at the other end thereof to said stator, and wherein said stator has coil means arranged to oscillate said armature when said coil means is energized, and wherein said stator has magnet means arranged to minimize movement of said armature when said coil means is not energized; and wherein said armature has first and second radial projections extending outwardly away from said third axis in radially opposite directions, said first and second armature radial projections respectively having first and second pairs of leg portions, each said pair of leg portions being spaced on opposite sides of said second axis substantially equidistant therefrom for oscillation about said third axis.

2. The system of claim 1, wherein said stator coil means includes first and second pairs of coil units disposed respectively adjacent to and cooperating with said first and second pairs of leg portions, and wherein said stator magnet means includes first and second pairs of magnet units disposed respectively adjacent to and cooperating with said first and second pairs of leg portions.

3. The device of claim 2, wherein said stator has a return plate composed of a ferrous material, said return path plate being fixedly connected to each said coil unit.

4. The device of claim 3 wherein each said torsion bar has a cross-section having a cruciform shape.

5. The device of claim 3 wherein each said torsion bar has a cross-section said cross-section having a cruciform construction whereby said construction provides sufficient stiffness to minimize the effect of external vibrations and accelerations on said armature.

* * * * *